United States Patent [19]

Nelson

[11] 4,011,767

[45] Mar. 15, 1977

[54] AXIALLY ADJUSTABLE MOUNTING FOR A BELT IDLER

[75] Inventor: John P. Nelson, Independence, Mo.

[73] Assignee: Allis-Chalmers Corporation, Milwaukee, Wis.

[22] Filed: Feb. 9, 1976

[21] Appl. No.: 656,332

[52] U.S. Cl. .................................... 74/242.15 R
[51] Int. Cl.² ........................................ F16H 7/10
[58] Field of Search ............ 74/467, 230, 242.11 R, 74/242.11 C, 242.15 R

[56] References Cited

UNITED STATES PATENTS

| | | | |
|---|---|---|---|
| 2,144,028 | 1/1939 | Pilkington | 74/242.15 R |
| 3,142,193 | 7/1964 | Polko et al. | 74/242.11 C |
| 3,636,786 | 1/1972 | Buck | 74/242.11 R |

Primary Examiner—Leonard H. Gerin
Attorney, Agent, or Firm—Charles L. Schwab

[57] ABSTRACT

An adjustable belt idler arrangement is provided which permits the axial position of the belt idler to be adjusted while the belt is running to achieve proper alignment of the idler with the belt under dynamic operating conditions. The idler can be adjusted during running of the belt even though the idler is disposed in a relatively inaccessible location.

11 Claims, 5 Drawing Figures

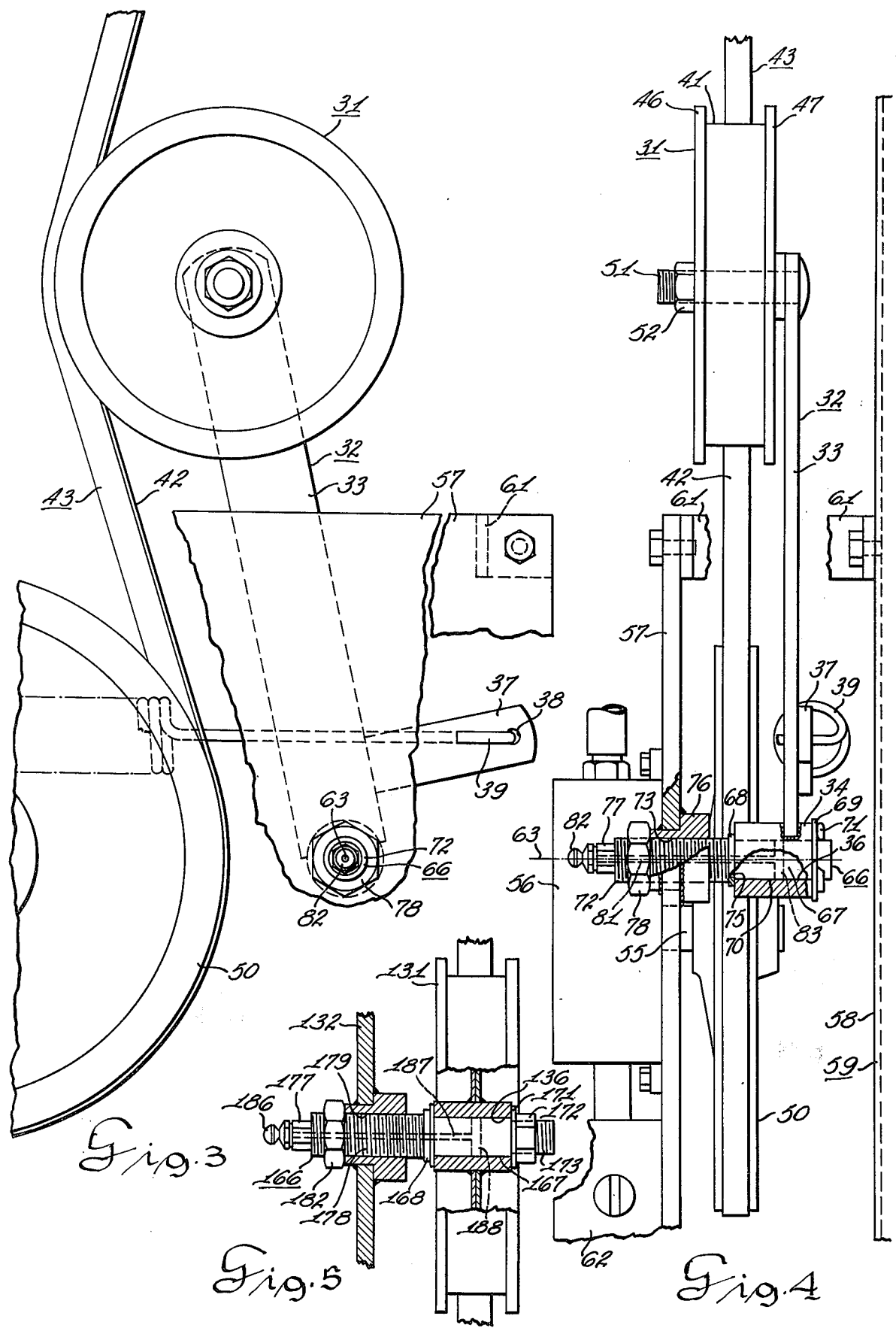

AXIALLY ADJUSTABLE MOUNTING FOR A BELT IDLER

BACKGROUND OF THE INVENTION

Proper alignment of a power transmitting belt and its belt idler is important to the life of the drive components, particularly the belt. This is especially true of a system wherein a flanged idler with a cylindrical belt engaging surface is used to engage the backside of a V-belt. If the belt rides against either flange, it will cause excessive belt side wear, and may cause the belt to turn over in the pulleys which adversely affects the internal load carrying structure of the belt. Historically, spring loaded idlers have presented alignment problems. The idler arm is often a weldment and also the mounting bracket for the idler arm may be a weldment. There is inherent warpage in welding components to one another and thus some means of compensating for the manufacturing tolerances is desirable in order to provide proper axial alignment of the idler pulley with the belt it engages. Another cause of idler misalignment is the tolerance build-up in the pulley, the idler arm and its mounting structure, which may result in the axis of the idler being out of parallelism with the backside of the belt. This will cause the belt to move in one axial direction or the other on the cylindrical face of the idler pulley.

One prior art arrangement for adjusting the axial position of the belt idler is illustrated in FIGS. 1 and 2. In addition to being rather expensive, this prior art adjusting arrangement is rather cumbersome and is not suitable for adjusting the idler when it is hidden behind a wall or panel, and, further, it is not suitable for adjustment during the running of the belt because of the inherent danger in performing the adjustment in close proximity to a running belt.

BRIEF DESCRIPTION OF THE INVENTION

The present invention contemplates mounting the idler arm, or the idler pulley itself, on a normally stationary support shaft having a bearing portion for the arm or the idler pulley and an externally threaded portion adapted for threaded engagement with a threaded bore in a support wall. A wrench receiving end is formed adjacent the threaded portion of the support shaft so that the shaft may be turned to adjust the position of the idler pulley disposed on the opposite side of the support wall. A suitable lock nut is used to lock the stationary shaft against rotation once it has been adjusted. The wrench receiving end of the shaft is drilled and tapped to receive a lube fitting and the shaft includes internal passages to permit lubricant to be delivered to the bearing portion of the shaft.

BRIEF DESCRIPTION OF THE DRAWINGS

A prior art construction and two embodiments of the present invention are illustrated in the drawings in which.

FIG. 3 is a side view of an idler arm mounting arrangement in which the present invention is incorporated;

FIG. 4 is an end view of a structure shown in FIG. 3; and

FIG. 5 is a partial section view of a second embodiment of the invention in which the idler pulley shaft is axially adjustable.

DETAILED DESCRIPTION OF THE DRAWINGS

Figure 1:
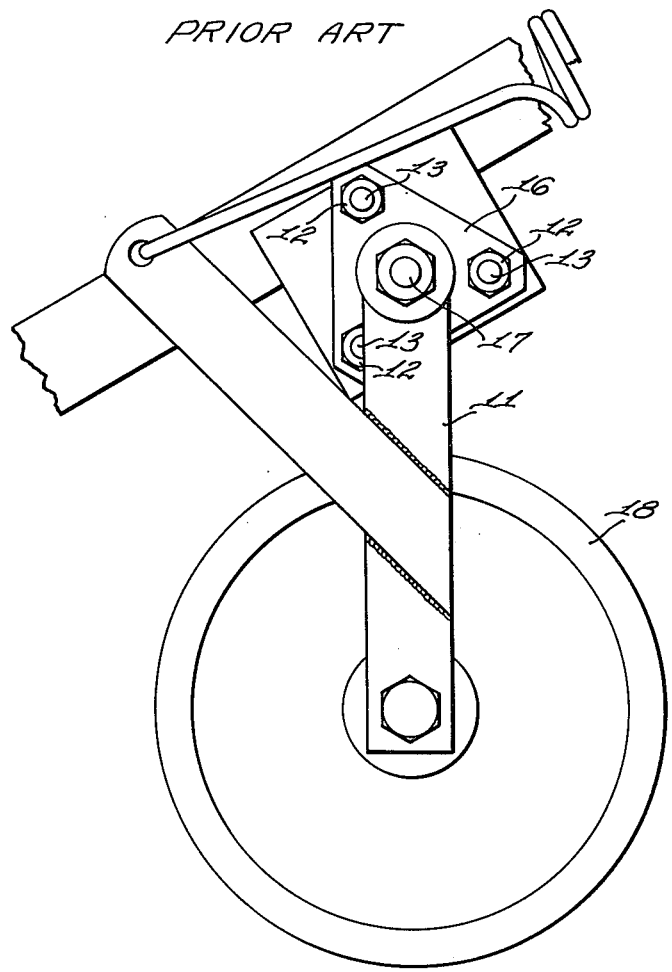
FIG. 1 is a side view of a prior art idler mounting with means for adjusting the axial position of the idler arm.
Figure 2:
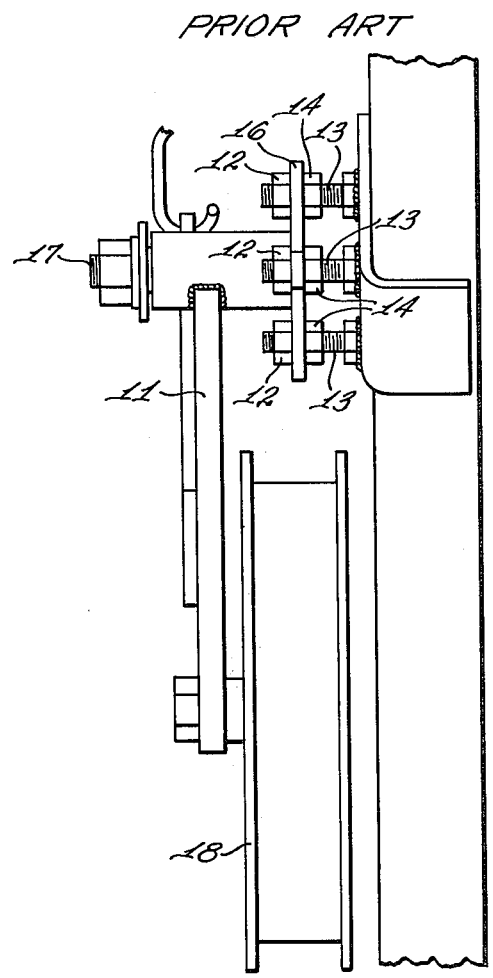
FIG. 2 is an end view of the idler mounting shown in FIG. 1.

In the prior art device shown in FIGS. 1 and 2 the axial position of an idler arm 11 is adjusted by loosening nuts 12 on the outer end of studs 13 and then turning the nuts 14 to reposition the plate 16 to which the idler arm pivot shaft 17 is rigidly secured as by welding. When the desired position of the plate 16 is effected for properly positioning the idler arm and the idler 18 rotatably connected thereto, the nuts 12 are retightened on the studs 13. While this means for axially adjusting a spring-loader idler arm has been satisfactory for some installations it is not suitable for use in a hidden installation of the idler arm. This prior art arrangement further is not suitable for adjusting the axial position of the idler arm while the machine is running, that is, while the belt is moving on the idler, because of the inherent danger of interference with the running belt. In using the prior art idler arm adjusting arrangement considerable time is required to make the necessary adjustment, and it is necessary to stop the machine when making the adjustment. Although, the idler position can be adjusted to what appears to be a correct position when the machine is not running it often happens that when the machine is running the belt will track differently on the idler pulley because of a slight difference in the idler angularity in relation to the belt surface it engages. Thus, it may be necessary to stop the machine again and make further adjustment before proper alignment of the idler with the belt is achieved.

Referring to FIGS. 3 and 4, a flanged idler pulley 31 is rotatably connected to an idler arm 32 which includes an elongated part 33 welded to a sleeve 34 having a cylindrical bore presenting a bearing surface 36. A finger 37 is secured by welding to the idler arm part 33 and includes an opening 38 in which one end of a tension spring 39 is hooked. The flanged idler pulley 31 includes a smooth cylindrical surface 41 in engagement with the flat backside 42 of a V-belt 43. The idler pulley also includes a pair of axially spaced, outwardly extending flanges 46 and 47 at laterally opposite sides of the cylindrical surface 41. The idler pulley 31 is rotatably mounted on the upper end of the idler arm 32 by a bolt 51 which is secured by a nut 52. The belt 43 runs between a V-belt pulley, not shown, and a driven V-belt pulley 51 with the spring loaded idler pulley maintaining proper belt tension for transmitting power. The pulley 50 is secured to the drive shaft 55 of a hydraulic pump 56 mounted on a panel 57, which is secured to the sidewall 58 of a machine such as a combine 59 by a bracket 61. It should be understood that other brackets similar to bracket 61 are employed to maintain the panel 57 in rigid parallel spaced relation to the sidewall 58. Other hydraulic system components such as a hydraulic valve 62 are also rigidly mounted on the panel 57. This outside panel mounting arrangement for the pump and valve makes them readily accessible for connection of hydraulic hoses and for servicing.

The idler arm is pivotally connected to a support shaft 66 which is parallel to the pump shaft 55 and the bolt 51 on which the idler pulley 31 is mounted. The shaft 66 has a cylindrical bearing portion 67 presenting a bearing surface 70 (disposed on the inward side of the panel 57) in bearing engagement with the cylindrical surface 36 of sleeve 34 of the idler arm 32. The sleeve 34 is held in an axially fixed position on the shaft 66 by a snap ring 68 in groove 75 and a washer 69, the latter being held in place by a cotter pin 71 extending through a transverse bore in the shaft 66. The shaft 66 includes an externally threaded portion 72 which is in threaded engagement with a drilled and tapped opening 73 of a collar 76 welded to the panel 57. The outer end of the shaft 66 adjacent to the threaded portion 72 includes a wrench receiving portion 77 in the shape of a hexagonal nut. A lock nut 78 is threaded onto the threaded portion 77 on the end of the shaft 66 extending outwardly beyond the outer side of the support or panel 57. The lock nut 78 maintains the threaded shaft 66 in the position to which it is axially adjusted, upon the nut 78 being tightened against the collar 76. The outer end of the shaft 66 is drilled and tapped at the end of a centered lube passage 81 to receive a lubrication fitting 82. A transverse oil passage 83 connects with the longitudinal passage 81 as to convey lubricant to the bearing surfaces 36, 70. The construction shown in FIGS. 3 and 4 permits the idler pulley to be adjusted axially relative to the shaft axis 63 by axial adjustment of the idler arm 32 mounting shaft 66. This is accomplished by loosening the nut 78 and then through the use of a wrench properly engaging the hex portion 77, the shaft 66 is turned and its threaded engagement with the internally threaded opening 73 will cause the shaft to move axially to reposition the idler arm 32 and the idler pulley 31. This adjustment can be made with the belt 43 running on its pulleys. This affords the opportunity to provide accurate alignment under actual, dynamic operating conditions. When the proper position of the idler arm has been obtained, the locking nut 78 is tightened against the end of the collar 76 thereby rigidly securing the shaft to the panel 57. The size and position of the panel is such that the space between the panel and the wall 58 of the combine 59 is relatively inaccessible for adjustment and servicing. However, by provision of the oil passages 81, 83 and the lube oil fitting 82, the bearing surfaces 36, 70 can be lubricated from the outer side of the panel 57 which is on the exterior of the combine.

Referring to FIG. 5 the second embodiment of the present invention is illustrated. In the second embodiment, the idler pulley itself is adjustable relative to its mounting structure or support 132 by use of a threaded support shaft 166. The shaft 166 has a smooth cylindrical surface 167 in bearing relation to radially inward facing cylindrical bearing surface 136 of the hub 137 of the double-flanged idler pulley 131. The idler pulley is held in place by a snap ring 168 and washer at one axial side and by a washer 171 and nut 172 on the other side. The nut 172 is in threaded engagement with a reduced diameter threaded portion 173 on the inner end of the shaft 166. The outer end of the shaft is hex shaped to form a wrench receiving portion 177 and an externally threaded portion 178 is formed between the hex portion 177 and the bearing portion 167. The threaded portion 178 is in threaded engagement with an internally threaded opening 179 of a collar welded to the support 132. A suitable locking nut 182 is provided to lock the shaft 166 in its axial position of adjustment. A lubrication fitting 186 is provided on the end of the shaft 166 to permit lubricant to be supplied to the bearing surfaces 136, 167 by way of internal lubricant passages 187, 188 in the shaft 166.

OPERATION

In a pump drive for a combine, it has been found desirable to mount the pump and at least some of the other hydraulic components such as valves on an exterior panel spaced from the outer wall of a combine. In this arrangement the drive shaft of the pump carries a pulley which is disposed between the hydraulic components panel and the sidewall of the combine. In order to properly tension the drive belt engaging the pump drive pulley a spring-loaded idler is preferably provided as shown in FIGS. 3 and 4. Such a spring-loaded idler is mounted on the hydraulic panel of a combine and, through utilization of the present invention, the idler arm is axially adjustable by virtue of the threaded cooperation of the idler arm shaft 66 and a drilled and tapped bore 73 in a collar 76 welded to the hydraulic components panel 57. The axial position of the idler pulley 31 can be adjusted while the belt 43 is running on the pulleys by loosening the nut 78 and screwing the shaft 66 through application of a wrench to the hex shaped portion 77 of the shaft. When the belt 43 is tracking in the center of the idler 31, the locking nut 78 is retightened to rigidly secure the shaft 66 in a stationary relationship with the panel 57. In the embodiment of FIG. 5, the idler pulley 131 may similarly be adjusted while the belt is running on the idler pulley 131. It should be understood that in the embodiment of FIG. 5, the support 132 may be either a sidewall or panel or it may be a spring-loaded idler arm.

The embodiments of the invention in which an exclusive property or privilege is claimed are defined as follows:

1. An adjustable mounting arrangement permitting axial adjustment of the position of belt idler means, comprising:
   a support having an internally threaded opening therethrough,
   a support shaft having
     an externally threaded portion in cooperative threaded engagement with said threaded opening with a part thereof extending beyond one side of said support,
     a wrench receiving portion on the end of said support shaft extending beyond said one side of said support,
     a bearing portion on the opposite end of said support shaft and disposed on the other side of said support,
   belt idler means supported on said bearing portion for relative movement about the axis thereof, and
   lock means engageable with said shaft and support for selectively locking said support shaft in selected positions of threaded adjustment relative to said support.

2. The mounting arrangement of claim 1 wherein said belt idler means is an idler pulley.

3. The mounting arrangement of claim 2 wherein said support shaft includes internal lubricant passage means between said bearing portion and said wrench receiving portions and further comprising a lube fitting on said one end of said support shaft in fluid communication with said lubricant passage means.

4. The mounting arrangement of claim 1 wherein said belt idler means includes an idler arm pivotally supported on said bearing portion.

5. The mounting arrangement of claim 4 wherein said support shaft includes internal lubricant passage means between said bearing portion and said wrench receiving portions and further comprising a lube fitting on said one end of said support shaft in fluid communication with said lubricant passage means.

6. The mounting arrangement of claim 4 wherein said belt idler means further includes spring means urging said arm in one direction of rotation about said support shaft.

7. The mounting arrangement of claim 1 wherein said support is a vertical panel secured to and disposed outwardly from the sidewall of a machine and further comprising a hydraulic pump mounted on said one side of said panel having a drive shaft parallel to said support shaft extending into the space between said panel and said sidewall, a pump drive pulley on said pump drive shaft, and a belt drivingly engaging said pump drive pulley and also engaging said belt idler means.

8. The mounting arrangement of claim 7 wherein said belt idler means includes a spring biased idler arm having one end pivotally connected to said bearing portion and a pulley rotatably mounted on the opposite end of said idler arm in cooperative engagement with said belt.

9. The mounting arrangement of claim 8 wherein said support shaft includes internal lubricant passage means between said bearing portion and said wrench receiving portion and further comprising a lube fitting on said one end of said support shaft in fluid communication with said lubricant passage means.

10. The mounting arrangement of claim 1 and further comprising means maintaining said belt idler means in an axially fixed position on said support shaft.

11. An adjustable mounting arrangement permitting axial adjustment of the position of belt idler means, comprising:
 a support having an internally threaded opening therethrough,
 a support shaft having
  an externally threaded portion in cooperative threaded engagement with said threaded opening with a part thereof extending beyond one side of said support,
  a wrench receiving portion on the end of said support shaft extending beyond said one side of said support, and
  a bearing portion disposed in axially spaced relation to said part,
 belt idler means supported on said bearing portion for relative movement about the axis thereof, and
 lock means engageable with said shaft and support for selectively locking said support shaft in selected positions of threaded adjustment relative to said support.

* * * * *